United States Patent [19]
Imoto et al.

[11] Patent Number: 5,706,124
[45] Date of Patent: Jan. 6, 1998

[54] RARE EARTH ELEMENT-DOPED OPTICAL FIBER AMPLIFIER

[75] Inventors: Katsuyuki Imoto, Saitama; Kazuo Koya; Jun Abe, both of Gunma, all of Japan

[73] Assignee: Hitachi Cable, Ltd., Tokyo, Japan

[21] Appl. No.: 629,593

[22] Filed: Apr. 9, 1996

[30] Foreign Application Priority Data

Nov. 13, 1995 [JP] Japan .................. 7-294336

[51] Int. Cl.⁶ .................. H01S 3/30; G02B 6/26
[52] U.S. Cl. .................. 359/341; 359/134; 385/115
[58] Field of Search .................. 359/134, 160, 359/337, 341, 349; 385/106, 115

[56] References Cited

U.S. PATENT DOCUMENTS

| | | | |
|---|---|---|---|
| 5,027,079 | 6/1991 | Deservire et al. | 372/6 |
| 5,140,456 | 8/1992 | Huber | 359/341 |
| 5,185,826 | 2/1993 | Delavaux | 359/134 |
| 5,225,925 | 7/1993 | Gruff et al. | 359/341 |
| 5,253,104 | 10/1993 | Delavaux | 359/341 |
| 5,532,870 | 7/1996 | Shigmatsu et al. | 359/341 |

FOREIGN PATENT DOCUMENTS

| | | |
|---|---|---|
| 5-345632 | 12/1993 | Japan . |
| 6-37385 | 2/1994 | Japan . |
| 6037385 | 2/1994 | Japan . |
| 6216441 | 5/1994 | Japan . |
| 5-299733 | 11/1993 | Jordan . |

OTHER PUBLICATIONS

Lidgard et al, Appl. Phys. Lett., vol. 56, #26, Jun. 25, 1990, pp. 2607–2609.

Aoki et al, IOOC–ECEC '91, Sep. 9, 1991 Paris France. Abst. Only Herewith.

Delavaux et al, Electron. Lett. (UK), vol. 281 #17, pp. 1642–1643, Aug. 13, 1992, Abst. Only Herewith.

*Primary Examiner*—Nelson Moskowitz
*Attorney, Agent, or Firm*—Lowe, Price, LeBlanc & Becker

[57] ABSTRACT

An Er-doped multiple-core optical fiber amplifier has an Er-doped multiple-core optical fiber. A signal light of 1.5 μm wavelength band is input through an optical isolator at front stage, and excitation lights of 0.98 μm or 1.48 μm wavelength emitted from excitation light sources are injected through a WDM coupler at front stage and a WDM coupler at rear stage, respectively. An amplified signal light is output through optical isolator at rear stage. A length $L_M$ of the Er-doped multiple-core optical fiber is set to obtain a substantially maximum saturated output power of the amplified signal light.

6 Claims, 7 Drawing Sheets

5,706,124

RARE EARTH ELEMENT-DOPED OPTICAL FIBER AMPLIFIER

FIELD OF THE INVENTION

This invention relates to a rare earth element-doped optical fiber amplifier, and more particularly to, a rare earth element-doped optical fiber amplifier having a high saturated output power, widely flat characteristics of gain to wavelength, and widely flat characteristics of noise figure to wavelength.

BACKGROUND OF THE INVENTION

These days, an optical fiber amplifier using a rare earth element-doped optical fiber, which is doped with rare earth element such as Er, Pr, Nd, etc. into a core thereof, has been developed and will be ready for practice. Among such optical fiber amplifiers, an Er-doped optical fiber amplifier, which can provide a high gain and a high saturated output power at the 1.55 µm wavelength band, is expected to be applied to various optical systems. Its application to a high-speed, large-quantity, and long-distance optical transmission system using a wavelength division multiplexing transmission technique of several channels between 1.53 µm and 1.56 µm wavelength bands, and an optical CATV system, for example, has been noted. In such optical transmission systems, it is important that the Er-doped optical fiber amplifier has flat gain characteristic in such wavelength bands.

In order to realize such flat characteristics of gain to wavelength, an Er-doped multiple-core optical fiber and a method for fabricating the same has been proposed by the inventors. The optical fiber comprises plural cores doped with Er and Al together, and an outer cladding layer which is provided around the cores, each of which is directly covered by a primary cladding layer. For this structure, the cores can contain much higher concentration of Al dopant than a single core in a conventional Er-doped optical fiber. Furthermore, gain of each core is to be lowered to obtain flat characteristics of gain to wavelength, then, high gain is provided by superposing all outputs thereof in addition to the flattened characteristics of gain to wavelength.

In such a proposed optical fiber amplifier using an Er-doped multiple-core optical fiber, however, the inventors have found disadvantages in that the flat characteristics of gain to wavelength and noise figure to wavelength are not sufficiently wide. Another disadvantage is that a saturated output power is low, and the flat characteristics of gain to wavelength are not obtained, when a length of the optical fiber is set to obtain the maximum gain in the optical fiber amplifier.

SUMMARY OF THE INVENTION

Accordingly, it is an object of the invention to provide a rare earth element-doped optical fiber amplifier in which saturated output power is high, and the flat characteristics of gain to wavelength and noise figure to wavelength are wider.

According to the feature of the invention, a rare earth element-doped optical fiber amplifier, comprises: an optical fiber doped with at least one rare earth element in a core thereof; and a light source for emitting an excitation light which is injected into the optical fiber to amplify a signal light transmitted through the optical fiber; wherein a length of the optical fiber is set to obtain a substantially maximum saturated output power of an amplified signal light, the amplified signal light being obtained by amplifying the signal light.

BRIEF DESCRIPTION OF THE DRAWINGS

The invention will be explained in more detailed in conjunction with the appended drawings, wherein.

DESCRIPTION OF THE PREFERRED EMBODIMENTS

Figure 1:
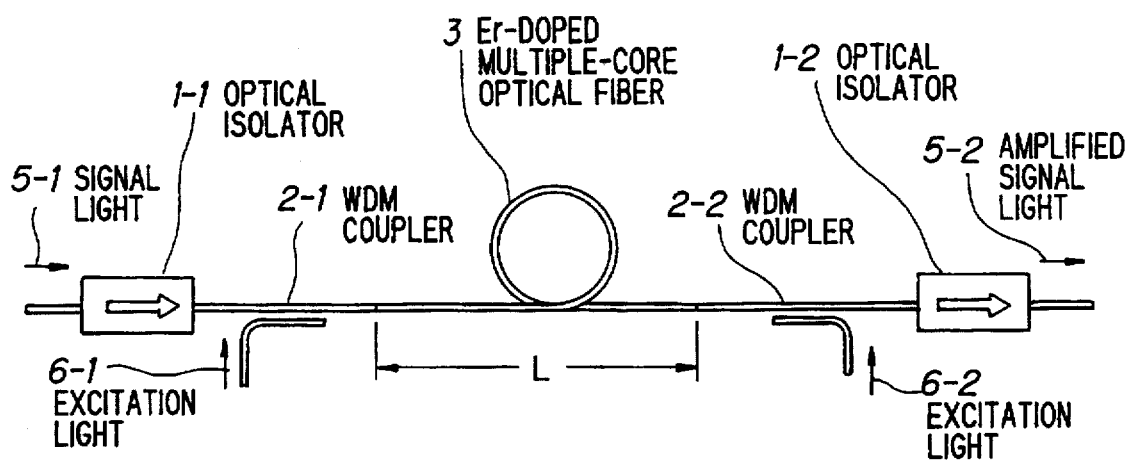
FIG. 1 is a structural view showing a rare earth element-doped optical fiber amplifier which is formerly proposed by the inventors.

Before explaining a rare earth element-doped optical fiber amplifier in the first preferred embodiment, the aforementioned inventors' proposed optical fiber amplifier will be explained in FIG. 1.

The Er-doped optical fiber amplifier comprises a certain length (=L) of an Er-doped multiple-core optical fiber 3, and light sources (not shown) for emitting excitation lights 6-1 and 6-2 to be injected through WDM couplers 2-1 and 2-2 into the optical fiber 3 at front and rear stages, respectively.

In operation, the excitation lights 6-1 and 6-2 are absorbed in the optical fiber 3 inherently to amplify a signal light 5-1 transmitted through the optical fiber 3 to obtain an amplified signal light 5-2. Optical isolators 1-1 and 1-2 are preferably used for suppressing a retrograde signal light of the amplified signal light 5-2.

Figure 11:
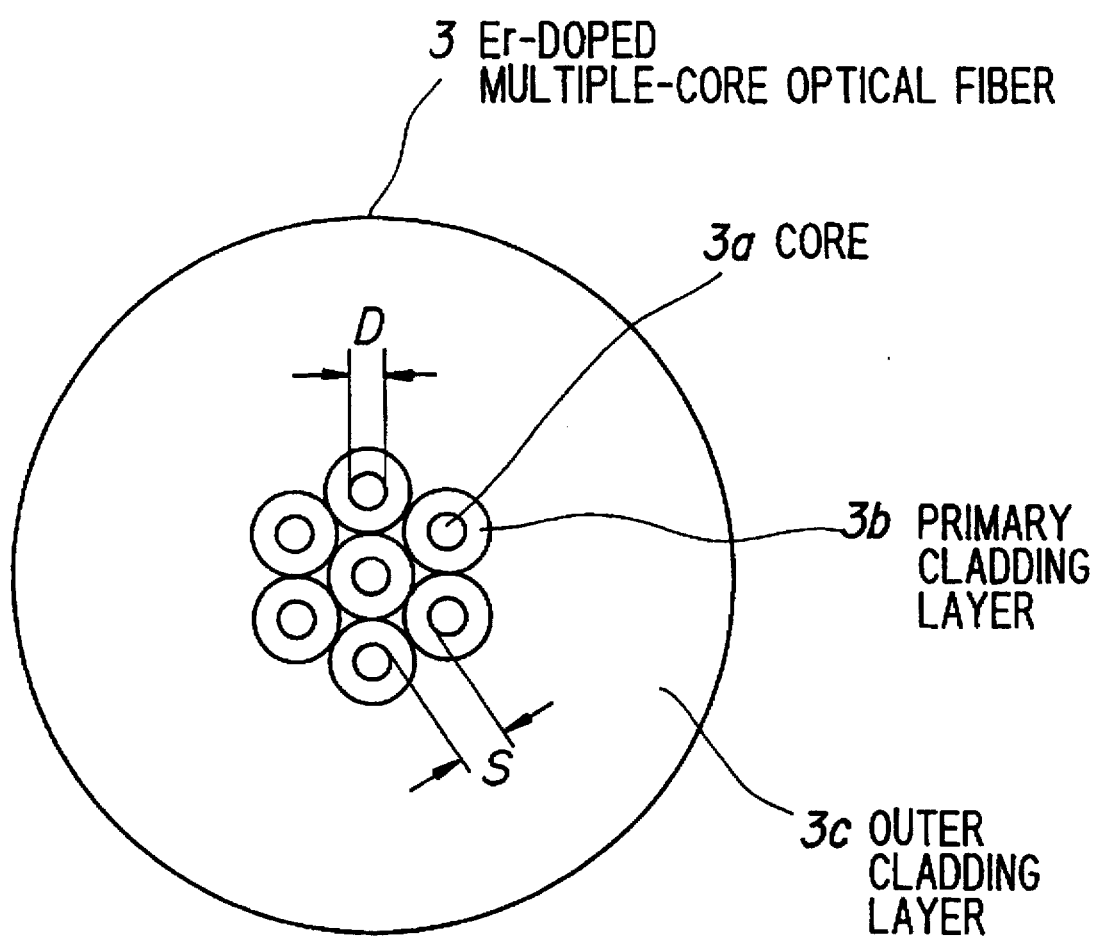
FIG. 11 is a cross-sectional view of a rare earth element-doped optical fiber used for the first, second and third embodiments according to the invention as well as the rare earth element-doped optical fiber amplifier which is formerly proposed by the inventors.

FIG. 11 shows the Er-doped multiple-core optical fiber 3 used for the proposed optical fiber amplifier. The Er-doped multiple-core optical fiber 3 comprises plural cores 3a (seven cores in this case) doped with Er and Al together, each of which is covered by a primary cladding layer 3b, and an outer cladding layer 3c which is provided around the cores 3a. It is preferable that a concentration of at least 300 ppm of Er and a concentration of at least 8000 ppm of Al are doped into each core 3a of the Er-doped multiple-core optical fiber 3.

Figure 12:
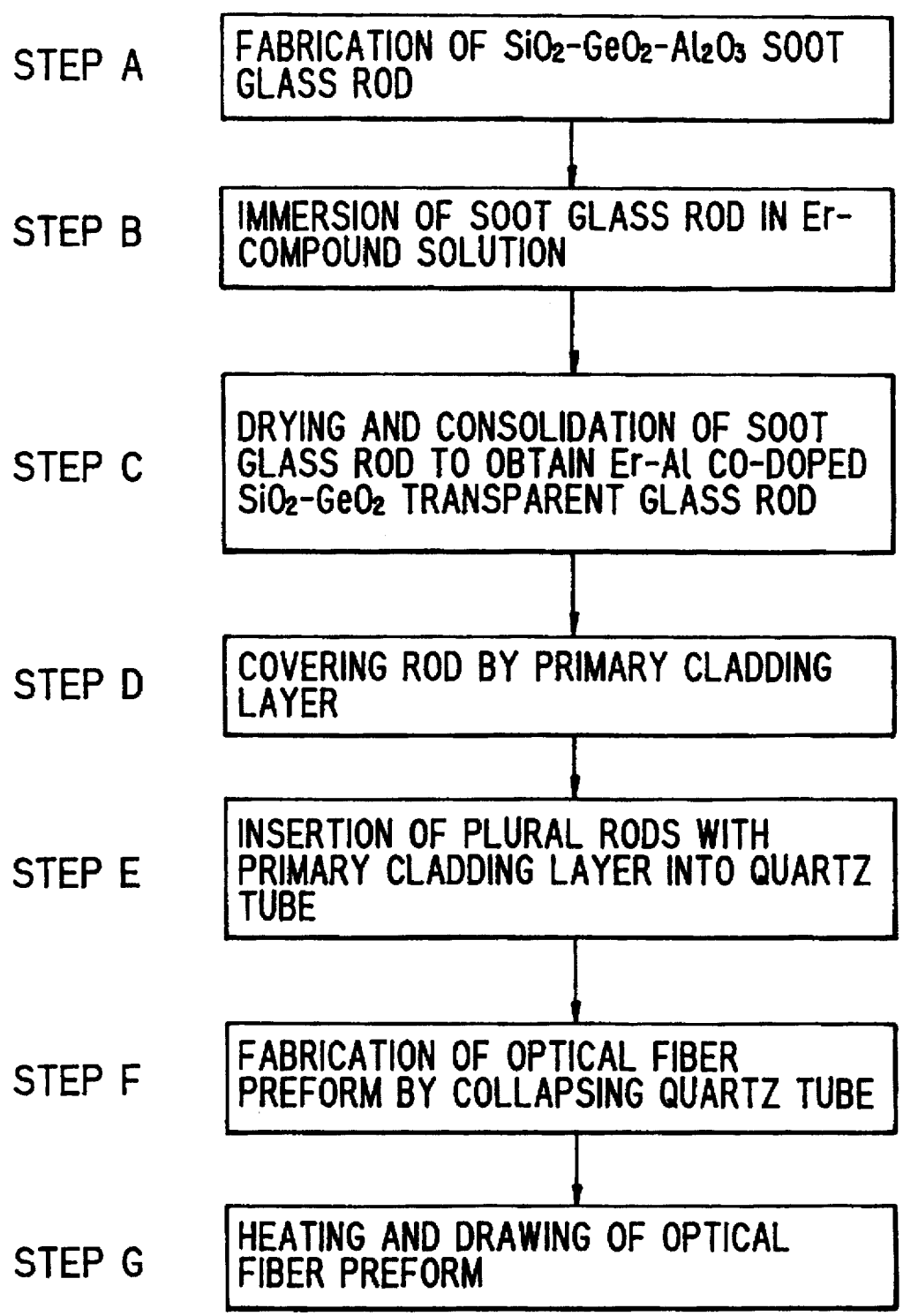
FIG. 12 is a flow chart showing a method for fabricating a rare earth element-doped multiple-core optical fiber used for the first, second and third embodiments according to the invention as well as the rare earth element-doped optical fiber amplifier which is formerly proposed by the inventors.

Next, now referring to FIG. 12, a method for fabricating an Er-doped multiple-core optical fiber proposed by the inventors will be explained below.

$SiO_2$-$GeO_2$-$Al_2O_3$ composite soot glass rods are fabricated by an ordinary fabrication process such as VAD method (at step A). Next, the soot glass rods are immersed in an Er-compound solution (at step B). Then the soot glass rods are picked up from the solution, dried and consolidated by an electrical heater to obtain Er-Al co-doped $SiO_2$-$GeO_2$ transparent glass rods (at step C). After that, each of the rods is covered by a primary cladding layer by an ordinary fabrication process such as outer CVD method (at step D), the rods with the primary cladding layers are inserted into a quartz tube (at step E), and the quartz tube is heated by oxyhydrogen-burner and collapsed to fabricate an optical fiber preform rod (at step F). Finally, the optical fiber preform is moved into an electric heater at a predetermined speed to be heated, an end of the fused rod is drawn out of the heater and wound around a drum to provide an Er-doped multiple-core optical fiber (at step G).

According to such structure of the Er-doped multiple-core optical fiber, as mentioned before, high gain is obtained as well as the flat characteristics of gain to wavelength. The reasons for this will be explained in more detail by the following.

The conventional characteristics of gain to wavelength show that an injected excitation light power is lowered, a peak of gain observed near 1.535 μm wavelength decrease, and the gain relative to wavelength becomes flat gradually. The excitation light power becomes lower, a right hand-increasing tendency is observed, that is to say, the gain at a shorter wavelength band (1.53 μm wavelength side) becomes lower, and the gain at a longer wavelength band (1.56 μm wavelength side) becomes high. If the excitation light power is extremely lowered, the gain is too low to be used as an optical fiber amplifier. The Er-doped multiple-core optical fiber utilizes such characteristics actively. If an outer diameter D of the core 3a, and a space S between the cores 3a is optimized so that the excitation light 6-1 and 6-2, and the signal light 5-1 are almost equally distributed in each core, a gain of each core is low but a flat gain relative to wavelength is obtained. The signal lights, being transmitted through a certain length (=L) of the fiber, are amplified in each core, respectively, and superposed as an output signal. As a result, the gain is high, and the characteristics of gain to wavelength are flattened.

Such Er-doped multiple-core optical fiber amplifiers with various fiber lengths (=L) are experimented, and the characteristics of gain to wavelength, gain to amplified signal light output power, and noise figure to wavelength are measured and estimated. The Er-doped multiple-core optical fiber, as shown in FIG. 11, which is provided with cores of 1.5 μm–2 μm diameter D, being spaced by approximately 1.3 μm each other by the primary cladding layers, is used in the experiments. A concentration of 450 ppm Er and that of 8500 ppm Al are doped in each core, and a specific refractive index difference between the core 3a and the primary cladding layer 3b is 1.45%. The front and back stage excitation light powers 6-1 and 6-2 are 70 mW and 80 mW, respectively. As a result, a maximum gain of 42 dB at a signal light input power of −37 dBm is obtained by an optical fiber amplifier with 50 m length of fiber.

Figure 2:
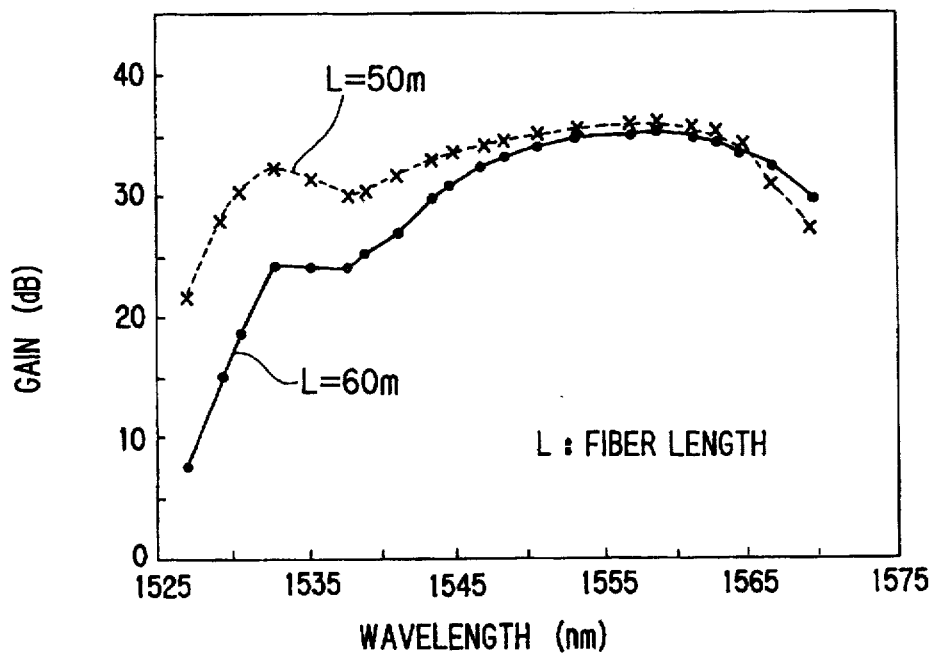
FIG. 2 is a graph showing the characteristics of gain to wavelength in the rare earth element-doped optical fiber amplifier shown in FIG. 1.

FIG. 2 shows the characteristics of gain to wavelength in the rare earth element-doped optical fiber amplifiers with fiber lengths of 50 m and 60 m. In the optical fiber amplifier with 50 m length of fiber at a signal light input power of −22 dBm, a wavelength band width where gain drops by 3 dB from its maximum value (hereinafter referred to as "3 dB band width") is approximately 23 nm, and a wavelength band width where gain drops by 1 dB from its maximum value (hereinafter referred to as "1 dB band width") is approximately 15 nm. These band widths are from one and a half times to twice as wide as those obtained by the conventional optical fiber amplifiers using single-core optical fibers.

Figure 3:
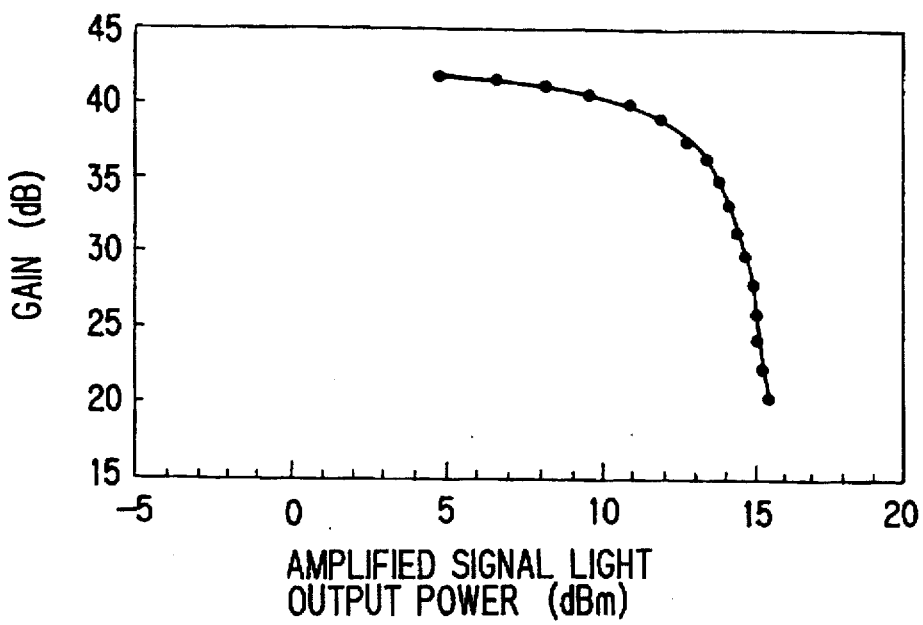
FIG. 3 is a graph showing the characteristics of gain to amplified signal light output power in the rare earth element-doped optical fiber amplifier shown in FIG. 1.

In the optical fiber amplifier with 50 m length of fiber whereby the maximum gain is obtained, however, a saturated output power is found to be low, i.e. the amplified signal light output power where gain drops by 3 dB from its maximum value is approximately 12.5 dB as shown in FIG. 3. It is also found that the flat characteristics of gain to wavelength are not sufficiently wide in such an optical fiber amplifier.

Figure 4:
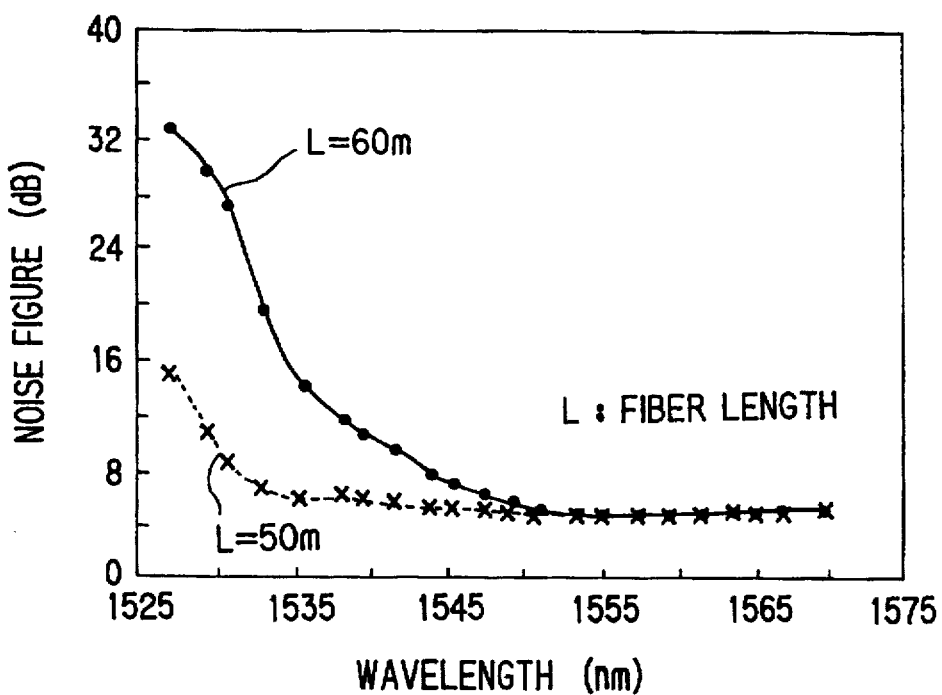
FIG. 4 is a graph showing the characteristics of noise figure to wavelength in the rare earth element-doped optical fiber amplifier shown in FIG. 1.

On top of that, noise figure has a wavelength dependency. FIG. 4 shows the characteristics of noise figure to wavelength in the optical fiber amplifiers with fiber lengths of 50 m and 60 m shown in FIG. 1. The result shows that noise figure is high at short wavelength side (near 1.53 μm wavelength), and as the wavelength becomes longer, the noise figure becomes lower. This indicates that it is difficult to obtain widely flat characteristics of gain to wavelength.

Figure 5:
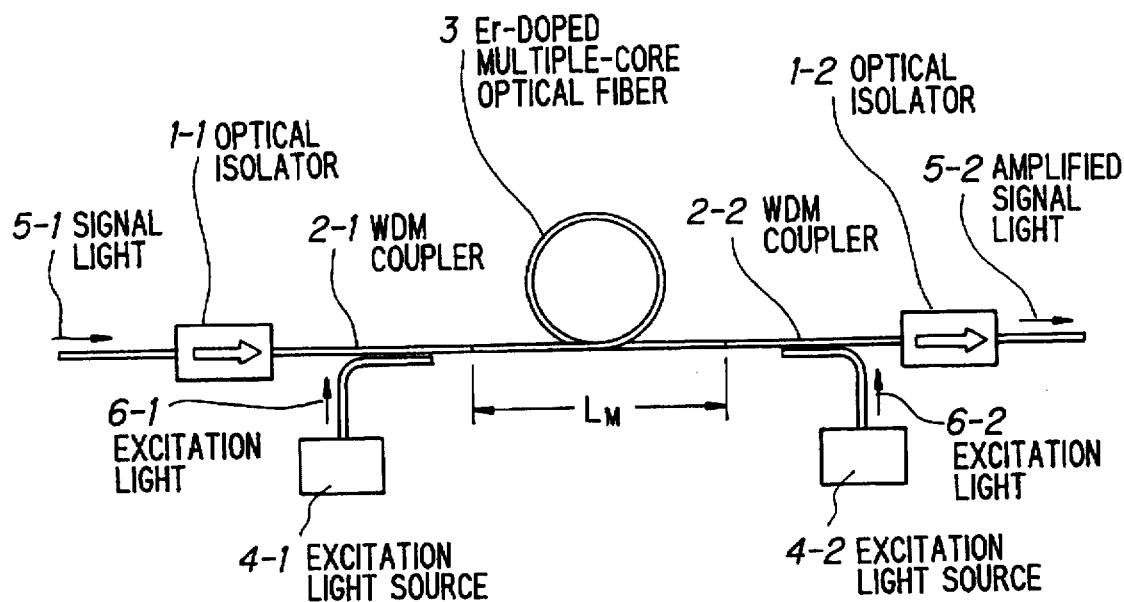
FIG. 5 is a structural view showing a rare earth element-doped optical fiber amplifier in a first preferred embodiment according to the invention.

Next, a rare earth element-doped optical fiber amplifier in a first preferred embodiment will be explained in FIG. 5, wherein like parts are indicated by like reference numerals as used in FIG. 1.

In the first preferred embodiment, an Er-doped multiple-core optical fiber amplifier comprises an Er-doped multiple-core optical fiber 3 having the same structure as shown in FIG. 11, an optical isolator 1-1 at front stage to which 1.5 μm wavelength band signal light is input, a WDM coupler 4-1 at front stage and a WDM coupler 4-2 at rear stage for injecting excitation lights 6-1 and 6-2 of 0.98 μm or 1.48 μm wavelength emitted from excitation light sources 4-1 and 4-2, respectively, and an optical isolator 1-2 at rear stage for outputting an amplified signal light 5-2. The Er-doped multiple-core optical fiber 3 is provided to be a predetermined length (=$L_M$) so as to provide the substantially maximum saturated output power for the amplified signal light 5-2.

In the inventors' experiment, the characteristics of optical fiber amplifiers with various lengths of Er-doped multiple-core optical fibers are measured. As a result, a significant discovery is made to solve the conventional disadvantages by the inventors.

Figure 6:
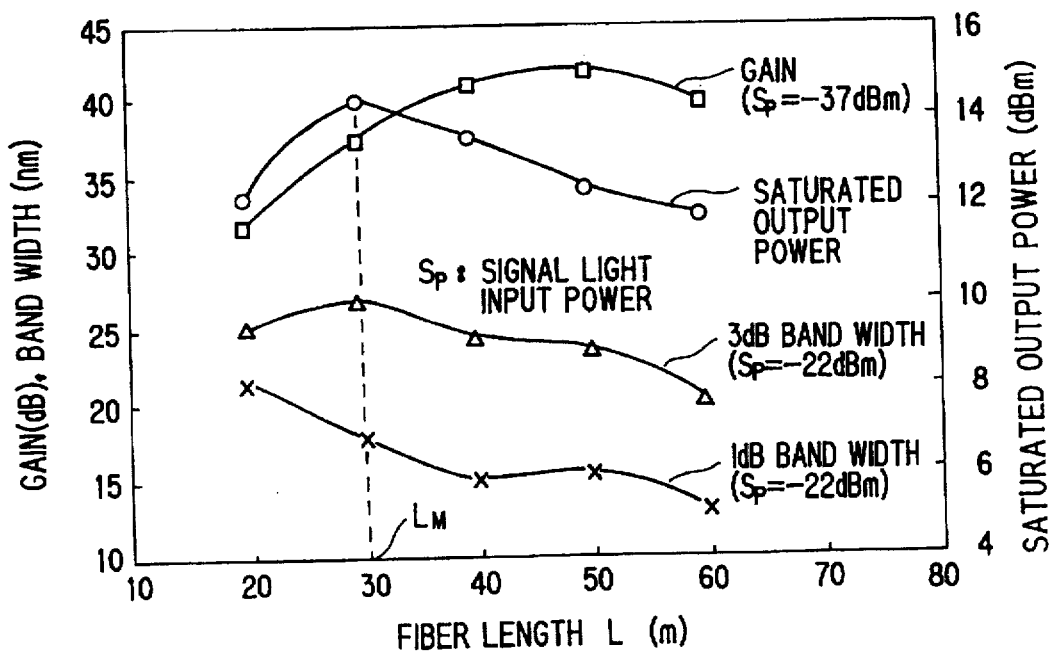
FIG. 6 is a graph showing the characteristics of gain, band width and saturated output power to fiber length of a rare earth element-doped optical fiber amplifier according to the invention.

FIG. 6 shows the characteristics of gain, band width, and saturated output power to fiber length, wherein gain is at a signal light input power of −37 dBm, 3 dB band width is at a signal light input power of −22 dBm, and 1 dB band width is at the same signal light input power. This indicates that the saturated output power depends on a fiber length L, and there is an optimum length $L_M$ where a substantially maximum value thereof is obtained, that is 30 m for the first preferred embodiment. In the optical fiber amplifier in the first preferred embodiment according to the invention, 3 dB band width has a maximum value, which is wider than that obtained by an optical amplifier having a fiber length where gain is maximum, and 1 dB band width becomes fairly wider than such conventional optical amplifier. Therefore the fiber length $L_M$ according to the invention is different from a fiber length where the maximum gain is obtained.

Figure 7:
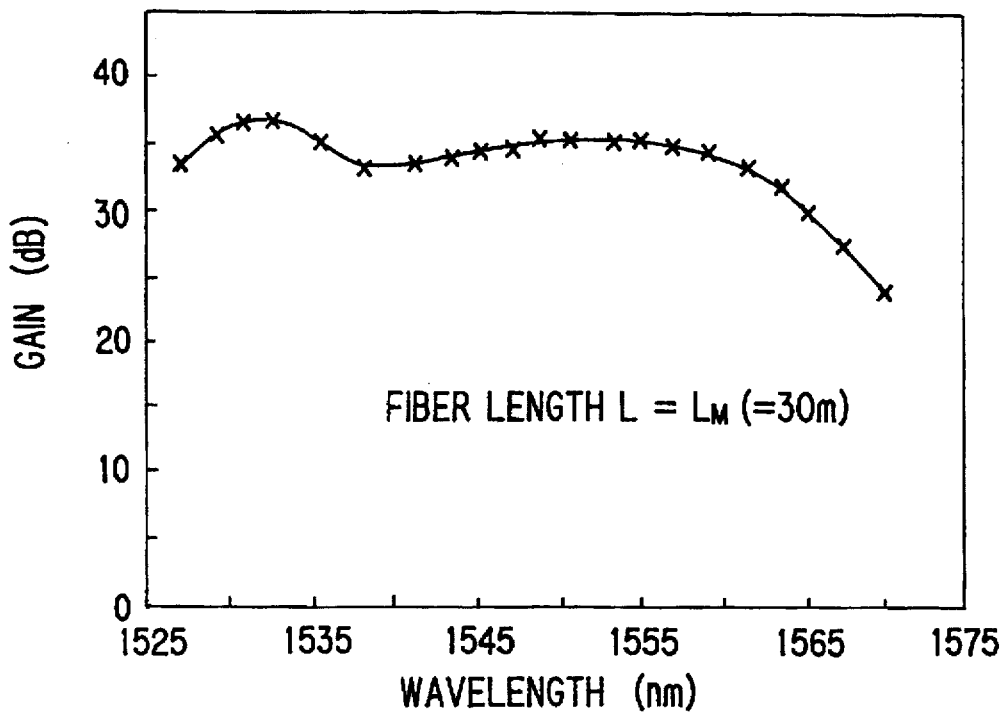
FIG. 7 is a graph showing the characteristics of gain relative to wavelength in the first preferred embodiment according to the invention shown in FIG. 5.

FIG. 7 shows the characteristics of gain to wavelength characteristic in the optical fiber amplifier in the first preferred embodiment, where the fiber length $L_M$ is 30 m. As indicated in FIG. 7, the flatness of gain is obtained even at a shorter wavelength band as compared to FIG. 2.

Figure 8:
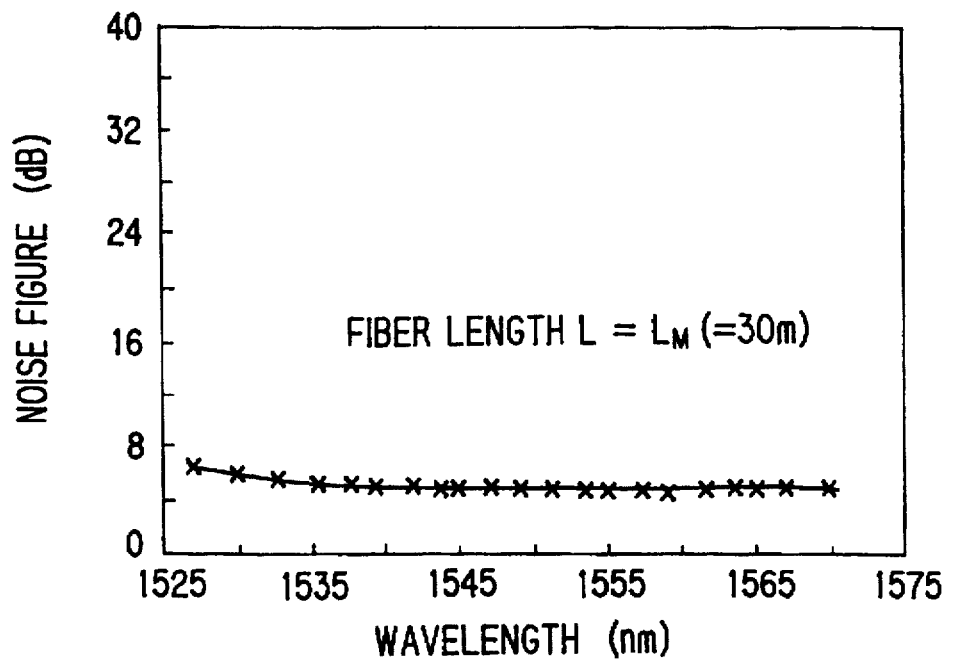
FIG. 8 is a graph showing the characteristics of noise figure to wavelength in the first preferred embodiment according to the invention shown in FIG. 5.

Another significant discovery made by the inventors is that the characteristics of noise figure to wavelength is substantially flat in the first preferred embodiment according to the invention as shown in FIG. 8. When plural wavelength channels of signal lights are amplified and transmitted through an optical fiber amplifier for wavelength division multiplexing communication, such flat characteristic of noise figure give a great advantage in that signal receiving characteristics, such as signal-to-noise ratio, signal receiving sensitivity, etc. are equalized.

The length $L_M$ of an Er-doped multiple-core optical fiber to obtain the maximum saturated output power depends on a concentration of Er doped into each core. The higher the concentration is, the shorter the fiber length $L_M$ becomes. On the contrary, the lower the concentration is, the longer the fiber length $L_M$ becomes. The concentration of Er in each core is 400 ppm for 30 m long fiber, and 800 ppm for 18 m long.

A saturated output power also depends on a power of the excitation light 6-1 and 6-2 emitted the from light sources 4-1 and 4-2. The higher the excitation power is, the saturated output power and the gain of the optical fiber amplifier become high.

In the first preferred embodiment, semiconductor laser light sources for emitting 0.98 μm wavelength lights, for example, are preferably used as excitation light sources 4-1 and 4-2. Light sources for emitting 1.48 μm wavelength lights may also be used, though the characteristics of noise figure to wavelength in the optical fiber amplifier becomes slightly worse. The excitation light 6-1 injected into the Er-doped optical fiber 3 at front stage thereof through the WDM coupler 2-1 is used for forward excitation, and the excitation light 6-1 injected through the WDM coupler 2-2 is used for backward excitation. It is preferable that both excitation light powers are adjusted as equally as possible to obtain high gain for such two-way excitation configuration.

The optical isolators 1-1 and 1-2 are preferably used for suppressing a reflected signal light at front stage to retrograde into a source (not shown) of the signal light 5-1, and suppressing a reflected signal light of the amplified signal light 5-2 at rear stage to retrograde into Er-doped multiple-core optical fiber 3.

In the first preferred embodiment, light sources which emit different wavelength excitation lights may be used as excitation light sources 6-1 and 6-2, respectively. For example, one may emits 0.98 μm wavelength light and the other may emits 1.48 μm wavelength light.

Figure 9:
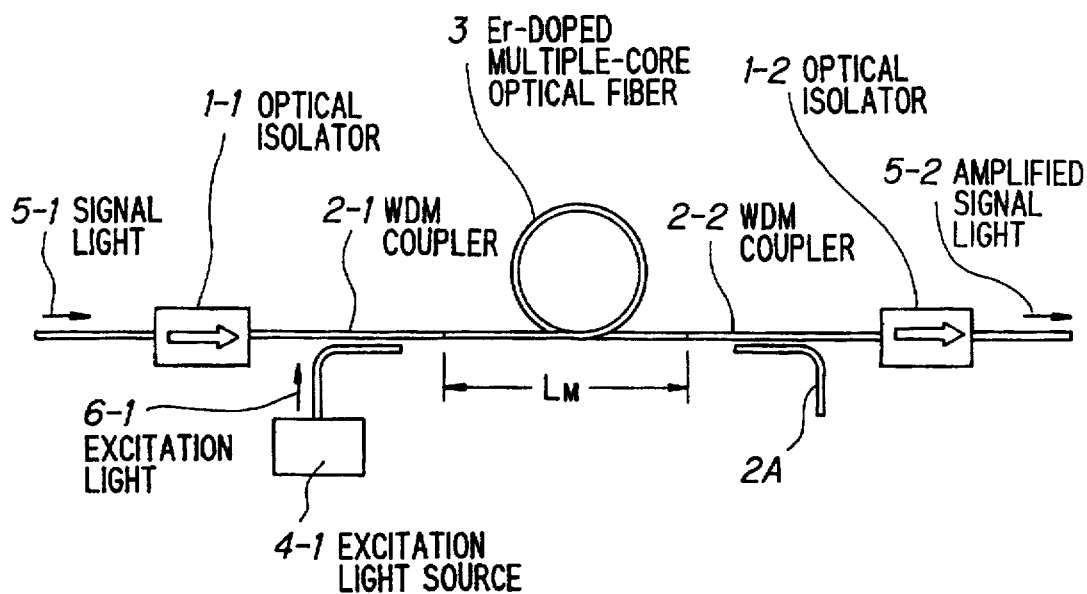
FIG. 9 is a structural view showing a rare earth element-doped optical fiber amplifier in a second preferred embodiment according to the invention.
Figure 10:
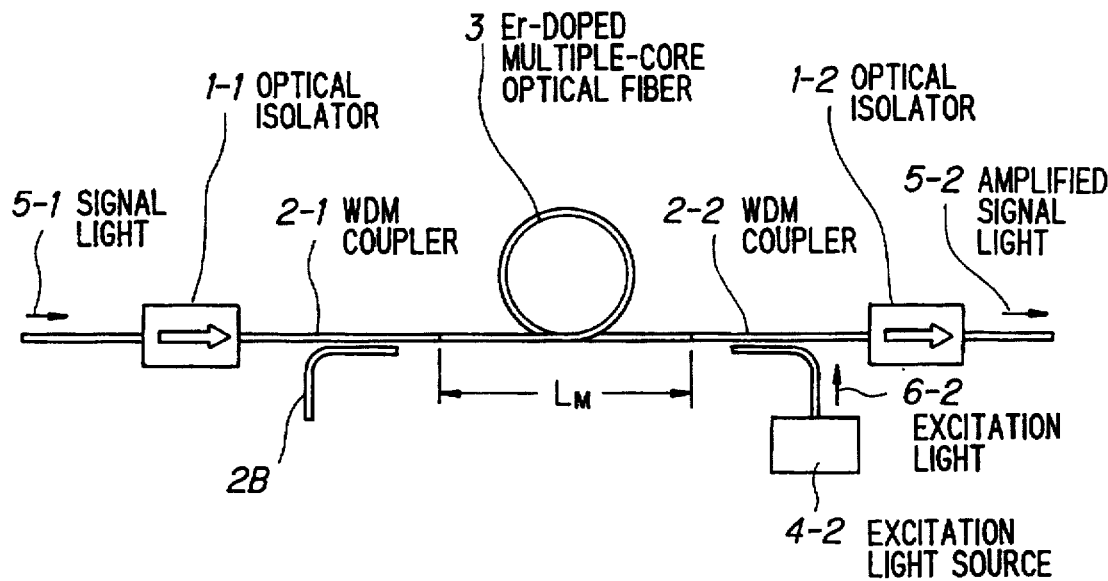
FIG. 10 is a structural view showing a rare earth element-doped optical fiber amplifier in a third preferred embodiment according to the invention.

Rare earth element-doped optical fiber amplifiers in second and third preferred embodiments will be explained in FIGS. 9 and 10, wherein like parts are indicated by like reference numerals as used in FIGS. 1 and 5.

In the second preferred embodiment, it is provided with only an excitation light source 4-1 at front stage for forward excitation, and an input end 2A of the WDM coupler 2-2 for connecting the other excitation light source at rear stage is to be open. In this case, a higher excitation power is required. For this purpose, two types of excitation light sources may be used for producing synthesized polarizations for example.

In the third preferred embodiment, it is provided with only an excitation light source 4-2 at rear stage, and an input end 2B of the WDM coupler 2-1 is to be open. A higher excitation power is also required in this case.

In the above preferred embodiments, it is preferable that an Er-doped optical fiber having Er-doped multiple-cores are used, but an optical fiber having an Er-doped single-core which is co-doped with Al with a high concentration of 2%~3% may be used. In the invention, Yb, Ce, Sm, and Nd other than Er may be used for a rare earth element to be doped into cores, and at least one of which may be added. The material which may be used as cores includes $SiO_2$ glass (including $Al_2O_3$-containing $SiO_2$, and $Al_2O$ -containing $SiO_2$ doped with an oxide such as $P_2O_5$, $GeO_2$ etc. for controlling refractive index thereof), fluorine compound, etc.

In the invention, a rare earth element-doped multiple-core optical fiber is not limited to an optical fiber having seven cores as shown in FIG. 11, but may include an optical fiber having a different number of cores such as three cores.

As well explained above, the invention provides advantages set out below.

(1) the flat characteristics of gain to wavelength become wide. Therefore, wavelength division multiplexing transmission systems and optical CATV systems having improved signal-to-noise ratio and cross-talk characteristics can be realized.

(2) the characteristics of noise figure to wavelength become flat, and a value of noise figure itself becomes lower. Therefore, a high-speed, large-quantity, and long-distance optical transmission system can be realized.

(3) a maximum saturated output power is increased. Therefore, a higher signal light power can be obtained, and longer-distance optical transmission systems and data distribution to more subscribers become possible.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A rare earth element-doped optical fiber amplifier, comprising:

an optical fiber provided with plural cores, each core being doped with at least one rare earth element; and a light source for emitting an excitation light which is injected into said optical fiber to amplify a signal light transmitted through said optical fiber;

wherein a length of said optical fiber is set to obtain a substantially maximum saturated output power of an amplified signal light, said length being different from a fiber length set for obtaining a maximum gain, said amplified signal light being obtained by amplifying said signal light;

whereby the flat characteristics of gain to wavelength and noise figure to wavelength are wider compared to an optical fiber length where maximum gain is obtained.

2. A rare earth element-doped optical fiber amplifier, according to claim 1, wherein:

each of said cores is doped with a concentration of at least 300 ppm of Er and a concentration of at least 8000 ppm of Al.

3. A rare earth element-doped optical fiber amplifier, according to claim 1, wherein:

said signal light has a wavelength band of 1.5 µm, and said excitation light has a wavelength of one or both of 0.98 µm and 1.48 µm.

4. A rare earth element-doped optical fiber amplifier comprising:

an optical fiber provided with plural cores, each core being doped with at least one rare earth element;

a light source for emitting an excitation light which is injected into said optical fiber to amplify a signal light transmitted through said optical fiber, thereby providing an amplified signal light;

an optical isolator at front stage of said optical fiber for suppressing a reflected signal light to retrograde into a light source for said signal light, and an optical isolator at rear stage of said optical fiber for suppressing a reflected signal light of said amplified signal light to retrograde into said optical fiber; and at least one WDM coupler at said front or rear stage of said optical fiber for injecting said excitation light emitted from said light source to said optical fiber;

wherein a length of said optical fiber is set to obtain a substantially maximum saturated output power of said amplified signal light, said length being different from a fiber length set to obtain a maximum gain;

whereby the flat characteristics of gain to wavelength and of noise figure to wavelength are wider compared to an optical fiber length where maximum gain is obtained.

5. A rare earth element-doped optical fiber amplifier, according to claim 4, wherein:

each of said cores is doped with a concentration of at least 300 ppm of Er and a concentration of at least 8000 ppm of Al.

6. A rare earth element-doped optical fiber amplifier, according to claim 4, wherein:

said signal light has a wavelength band of 1.5 µm, and said excitation light had a wavelength of one or both of 0.98 µm and 1.48 µm.

* * * * *

UNITED STATES PATENT AND TRADEMARK OFFICE
CERTIFICATE OF CORRECTION

PATENT NO.  : 5,706,124
DATED       : January 6, 1998
INVENTOR(S) : Katsuyuki IMOTO et al.

It is certified that error appears in the above-identified patent and that said Letters Patent is hereby corrected as shown below:

On the title page, item [73] should read as follows:

--[73] Assignee: Hitachi Cable, Ltd.; Shin-Etsu Chemical, Co., Ltd., both of Tokyo, Japan--

Signed and Sealed this

Fourteenth Day of September, 1999

Attest:

Q. TODD DICKINSON

*Attesting Officer*     *Acting Commissioner of Patents and Trademarks*